J. H. MICHELIN.
APPARATUS FOR MOLDING FANCY TREAD TIRES.
APPLICATION FILED JAN. 10, 1916. RENEWED SEPT. 14, 1916.

1,209,607.

Patented Dec. 19, 1916.

Witnesses
Edwin J Beller
R. J. McWhinney

Inventor
Jules H. Michelin,
by Wilkinson, Guista & MacKaye,
Attorneys.

UNITED STATES PATENT OFFICE.

JULES HAUVETTE MICHELIN, OF NEW BRUNSWICK, NEW JERSEY, ASSIGNOR TO MICHELIN TIRE COMPANY, OF MILLTOWN, NEW JERSEY, A CORPORATION OF NEW JERSEY.

APPARATUS FOR MOLDING FANCY-TREAD TIRES.

1,209,607.      Specification of Letters Patent.      Patented Dec. 19, 1916.

Application filed January 10, 1916, Serial No. 71,288. Renewed September 14, 1916. Serial No. 120,195.

*To all whom it may concern:*

Be it known that I, JULES HAUVETTE MICHELIN, a citizen of the French Republic, residing at New Brunswick, in the county of Middlesex and State of New Jersey, have invented certain new and useful Improvements in Apparatus for Molding Fancy-Tread Tires; and I do hereby declare the following to be a full, clear, and exact description of the invention, such as will enable others skilled in the art to which it appertains to make and use the same.

My present invention relates to the manufacture of fancy tread tires, and it is intended to provide a cheap, simple, efficient and durable means by which fancy treads may be molded on rubber tires. Under the present practice these tires are either—(1) manufactured in shells, or parts of shells, in which are cut, with the help of lathes or milling machines, different kinds of grooves which show in intaglio the design to be reproduced in relief on the tread of the tires: or (2) there is placed on the outer rim of the tire a strip of flexible elastic material, such as rubber, which is produced in a special mold bearing the desired design.

The first process requires a mold for each design of relief to be secured, and it is very expensive to obtain certain forms of relief; moreover this requires the use of molds in several sections, to permit the taking out of the tire. The second process is also objectionable, for besides requiring as many special molds for obtaining the rubber strips as there as designs desired, it also requires the continual replacing of the rubber strips, which are quickly burnt in the process of vulcanizing, and can only make a few cores. These objections are in a large measure obviated by the use of the apparatus hereinafter described.

Reference is had to the accompanying drawings, in which:—

Figure 1:
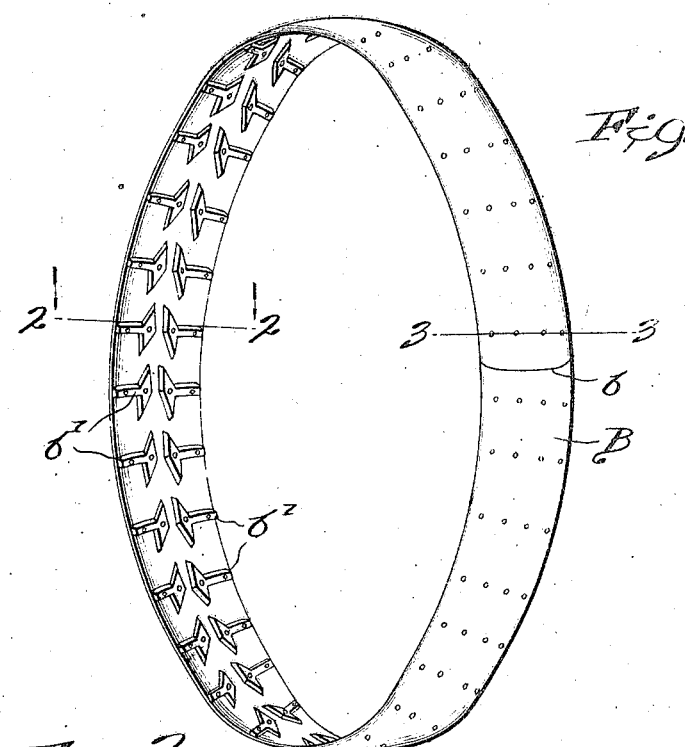
Figure 2:
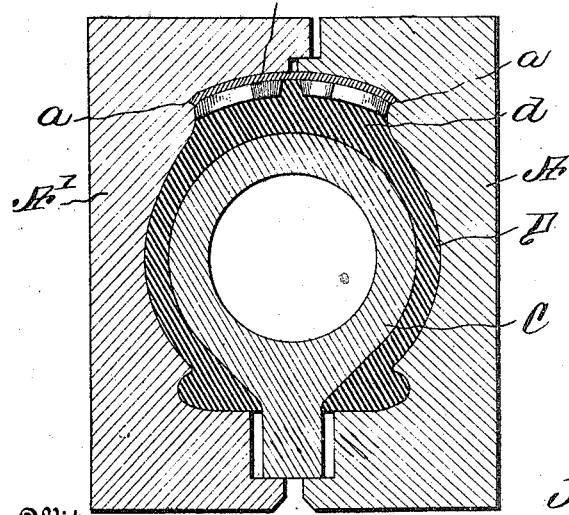
Figure 3:
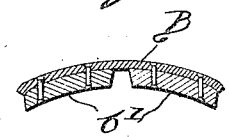

Figure 1 shows a perspective view of a resilient split steel band having the design formed of a series of separate units riveted thereto; Fig. 2 shows the band and tire assembled in the mold, the band being shown in section along the line 2—2 of Fig. 1, and parts of the rubber tire obscuring the projections on the band being omitted; and Fig. 3 shows a section through the band along the line 3—3 of Fig. 1.

A and A' represent the two side members or shells of an annular mold constructed in the usual way, which members are cut away slightly, as at $a$, to permit the insertion of the resilient band B, which is split as at $b$, and is provided on its interior with a series of forms $b'$ riveted thereto, which together constitute in relief the design to be shown in intaglio on the tread of the tire.

C represents the interior core used in molding the tire, and D represents the tire whose tread $d$ is molded in intaglio to correspond with the design shown in relief on the interior of the band B.

The tire is molded in the mold in the usual way, and when the shells A and A' are removed the band B may be readily sprung away from the tire in a single operation.

The band B should preferably be made of steel, or other resilient metal, and may be quite thin and light, and the forms $b'$, which may be of any desired configuration, may be stamped out or riveted to the interior of said band, as shown in Figs. 1 and 3.

By having bands with different styles of design in relief thereon, various styles of fancy treads may be molded on the tires. It will be seen that these bands are cheap and light, and that the application of the design thereto may be very cheaply and readily done without the necessity of any high grade or expensive machine work in cutting the same.

It is also evident that, if desired, plain bands may be substituted for the bands having the design thereon, as shown in Fig. 1, in which case plain tread tires may be made. Thus, by using the same shells I am able to mold plain tread casings for tires, and, by using the embossed band, to mold all the designs required, by simply changing the form of the design. It will be noted that the band with the design thereon will ordinarily last as long as the side shells constituting the mold, and that thus the apparatus is very durable, as well as very cheap and simple.

While I have shown one mode of molding the tire with the fancy tread thereon, I do not mean to limit the invention to any particular mode of molding the tire proper, as any of the various methods now used in this art may be adopted if desired.

It will be obvious that various modifications in the herein described apparatus, and in the construction, combination and arrangement of parts may be made which could be used without departing from the spirit of my invention.

Having thus described my invention what I claim and desire to secure by Letters Patent of the United States is:—

1. A mold for tires comprising two detachable side members or shells, and a thin split resilient metal band of substantially the width of the tread of the tire, and provided with a design in relief formed of a series of separate pieces secured on the interior of said band, said band being mounted between said shells and forming therewith a mold for the tread of the tire, substantially as described.

2. As an article of manufacture for use in molds for fancy tread tires, a thin split resilient metal band of substantially the width of the tread of the tire and provided with a design in relief formed of a series of separate pieces secured on the interior of said band.

In testimony whereof, I affix my signature.

JULES HAUVETTE MICHELIN.